June 28, 1966  F. LONGOBARDI  3,257,726
RAZOR BLADE HOLDER
Filed Feb. 28, 1964
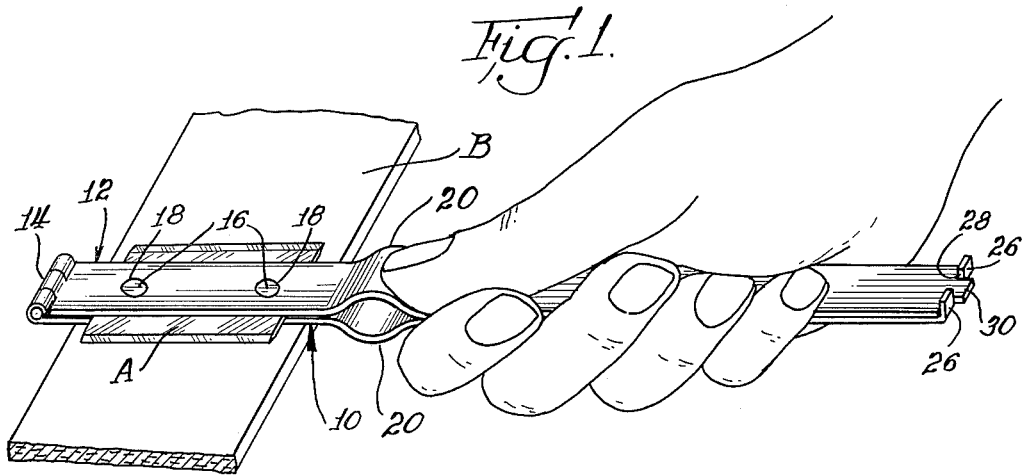
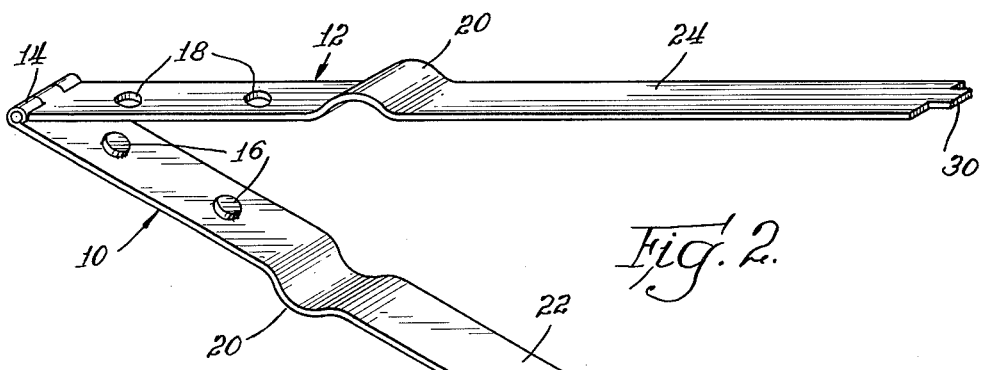
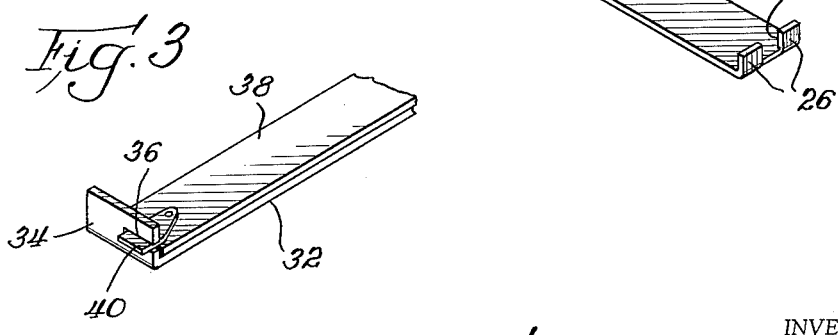
INVENTOR:
Felice Longobardi
BY
Kent W. Wonnell
Att'y.

3,257,726
RAZOR BLADE HOLDER
Felice Longobardi, 3643 W. 55th St., Chicago, Ill.
Filed Feb. 28, 1964, Ser. No. 348,094
1 Claim. (Cl. 30—331)

This invention relates particularly to a hand holder and guard for a razor blade at the time of honing it, and an important object is to protect the hand or the fingers from coming in contact with the blade itself and the hone in the operation of sharpening a razor blade.

Other objects of the invention are: to confine a blade between hinged holders, to hold them in engagement with a blade, and to keep the holds in properly spaced position; to provide two flat holder members with corresponding handle members of sufficient length to have a limiting stop at the inner end of the handle and engaging means at the outer end; to lock the handle members together with a blade between them when not in manual engagement; and to protect the fingers and hand from slipping on the handle to contact with a blade, and to confine the blade holding portion to a slidable contact with a hone.

Other objects will appear in the specification will be apparent from the accompanying drawings, in which:

FIG. 1 is a perspective view of a hinged holder in accordance with this invention as gripped by the handles in one hand, with stop means limiting the movement of the hand toward the blade, and with a free spacing means at the end; FIG. 2 is a perspective open view of the holder shown in FIG. 1; and FIG. 3 is a perspective view of a locking type of handle spacing means.

In holding a razor blade for honing it, one of the most desirable features is to provide smooth rewinder and stop means to limit the encroachment of the hand or fingers on the holder handles into the path of a hone, as well as to protect them from contact with the blade. This may not be too simple in the flat handle type of holder, without the addition of additional parts, but is accomplished in the present holder by making a smooth and rounded projection in each handle member, between the blade gripping and the handle holding portions, by having handle holding of sufficient length for manual contact, and also to provide end engaging means to position, space, and keep the ends of the handle members together, if desired.

Referring now more particularly to the drawings, two flat holder members 10 and 12 have a hinge 14 connecting them for swinging movements. One of the members, as 10, has projections 16 near the hinge, and the other has depressions or holes 18 corresponding to the projections for holding a razor blade, as A, in a fixed location, between the holder members 10 and 12 when they are moved together on their hinge 14.

Just beyond the ordinary length of a blade A one or both of the holder members 10 and 12 is formed with a wavy projection 20, extending outwardly, and oppositely, if in both holder members. These projections 20 do not interfere with the positioning of a blade between the holder members, but materially assist in locating a blade A between the members and on the projections 16 before they are gripped by the holders.

At the outer or free end of each holder member 10 and 12 is a handle portion 22 and 24 respectively, separated from free end by the projection 20. These handle portions are somewhat longer than the blade engaging portion so that a hand grasping the handles, with the thumb in contact with the projection 20, will not ordinarily extend beyond or overlap the free end.

The free ends of the handle members 10 and 12 may therefore be provided with interengaging portions for holding the members together or in registration with each other; one handle member, as 10, in FIG. 2, may have a bent end 26 with a central slot or recess 28, and the other member 12 may have a central tongue 30 adapted to be seated in the slot 28 and to project through it as a recess, when the two handle members 10 and 12 are grasped and the free ends pressed together.

Or as shown in FIG. 3 one member 32 may have a bent end projection 34 with a lateral slot 36, and the other member 38 may fit within the bent end projection 34 and have a pivoted latch 40 which may be moved into engagement with the lateral slot 36 to firmly position these ends in registering position, and to lock them in engagement with each other, when the handle members are moved together.

With this construction, a hand of a user in grasping the opposite handle members 10 and 12 will be limited in its movement by the thumb or forefinger engaging the projection 20 of one or the other, or both, and a blade A may be applied to a hone B, usually larger than or overlapping the blade. A blade A is held firmly in position for sharpening the edges on the hone, but the projection 20 spaces the hand from contact with the blade A or the hone B in the sharpening or other operations.

To remove a blade A from a holder, a latch 40, if there is one is first disengaged from the handle members 10 and 12, the free ends are separated, a blade A is taken out for cleaning, replacement, or storage; and the handle members may be again locked in closed position, for compactly packing them.

While I have described the preferred construction, with a slight modification, in some detail, it should be regarded as an illustration or example rather than a limitation or restriction of the invention, as various changes in the construction, combination or arrangement of the parts may be made without departing from the spirit and scope of the invention.

I claim:

A razor blade holder and honer for double-edged blades having aligned openings along the center comprising:
  (a) two metal flat strap members hinged together at one end of each one and the other two ends swinging flatly apart to admit a razor blade between them at the hinged end and to clamp it when they are closed on their hinge;
  (b) each member having a blade receiving portion near its hinged end of a length about that of a razor blade and a width less than a blade;
  (c) means in the blade receiving portions of the two members for engaging the central openings and holding at least one blade edge projecting from the edge of the blade receiving portions when they are moved together with a blade between them;
  (d) a handle portion on each member extending beyond the blade receiving portion for a greater distance than the blade portion and the handle portions of the two members folding flatly together to provide a hand grip with a blade held in the blade receiving portions;
  (e) and stop means comprising a wave projection from each of the two flat members extending oppositely outwardly from the planes of the two members movable together to provide hand and finger projecting stops at both outer sides of the handle portions to indicate blade proximity and to limit manual engagement to the handle portions in applying the members to hone a blade.

(References on following page)

References Cited by the Examiner

UNITED STATES PATENTS

| | | | |
|---|---|---|---|
| 869,757 | 10/1907 | Ward | 30—331 |
| 887,682 | 5/1908 | Medbery | 30—331 |
| 997,110 | 7/1911 | Bowers | 30—333 |
| 1,436,740 | 11/1922 | Wesson | 30—331 |
| 3,077,034 | 2/1963 | Stineman | 30—331 X |

FOREIGN PATENTS

| | | |
|---|---|---|
| 417,807 | 9/1910 | France. |
| 500,458 | 12/1919 | France. |
| 563,940 | 6/1957 | Italy. |

WILLIAM FELDMAN, *Primary Examiner.*

JAMES L. JONES, JR., *Examiner.*